(12) United States Patent
Lee et al.

(10) Patent No.: US 7,517,940 B2
(45) Date of Patent: Apr. 14, 2009

(54) CATALYST COMPOSITION INCLUDING TRANSITION METAL COMPLEXES AND OLEFIN POLYMERIZATION USING THE SAME

(75) Inventors: Eunjung Lee, Daejeon (KR); Choong Hoon Lee, Daejeon (KR); Seungwhan Jung, Suwon (KR); Jung A Lee, Gangwon-do (KR); Boram Lee, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/670,259

(22) Filed: Feb. 1, 2007

(65) Prior Publication Data

US 2007/0179046 A1 Aug. 2, 2007

(30) Foreign Application Priority Data

Feb. 1, 2006 (KR) ........................ 10-2006-0009824

(51) Int. Cl.
*C08F 4/42* (2006.01)
*C07F 7/28* (2006.01)

(52) U.S. Cl. .................... 526/160; 526/116; 526/113; 526/161; 526/172; 526/943; 502/103; 556/51

(58) Field of Classification Search ................. 526/116, 526/113, 161, 172, 160, 943; 502/103; 556/51
See application file for complete search history.

(56) References Cited

U.S. PATENT DOCUMENTS

| 5,399,635 | A | 3/1995 | Neithamer et al. |
| 5,453,410 | A | 9/1995 | Kolthammer et al. |
| 6,090,739 | A | 7/2000 | Riedel et al. |
| 6,153,776 | A * | 11/2000 | Patton et al. .................. 556/11 |
| 6,228,790 | B1 * | 5/2001 | Ting et al. .................... 502/102 |
| 6,235,917 | B1 * | 5/2001 | Graf et al. ..................... 556/11 |
| 2003/0191334 | A1 | 10/2003 | Schottek et al. |

FOREIGN PATENT DOCUMENTS

| EP | 0416815 | 8/1990 |
| EP | 0418044 | 9/1990 |
| EP | 0520732 | 6/1992 |

| WO | 2007007992 | 1/2007 |

OTHER PUBLICATIONS

Gomes, et al.; "Ansa-bridged n-cyclopentadienyl imido and amido derivatives of titanium, zirconium, niobium and molybdenum"; Journal of Organometallic Chemistry; vol. 541; pp. 121-125; 1997.
Anastassiou, et al.; "NMR detection of anions of N-methyl-1-benzazocinide; 1-benzazocindiide, and dibenz[b.g] azocindiide, a family of aromatic charge trans compounds"; Angew, Chem. vol. 94, No. 10; pp. 803-804; 1982.
International Search Report dated May 4, 2007 for Application No. PCT/KR2007/000560 (All references cited in Search Report are listed above).

* cited by examiner

*Primary Examiner*—Ling-Siu Choi
(74) *Attorney, Agent, or Firm*—Cantor Colburn LLP

(57) ABSTRACT

Provided is catalyst composition including a transition metal complex precatalyst represented by Formula 1; a first cocatalyst represented by Formula 2 which is an alkylaluminum compound; and a second cocatalyst represented by Formula 3 which is a salt compound comprising a Bronsted acid cation and a noncoordinating, compatible anion.

Formula 1

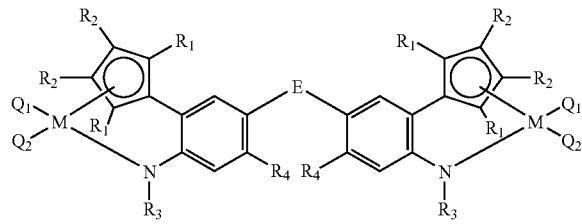

Here, $R_1$, $R_2$, $R_3$, $R_4$, E, $Q_1$, $Q_2$ and M are defined in the specification.

$Al(R_6)_3$      Formula 2

Here, $R_6$ is defined in the specification.

$[L-H]^+[ZA_4]^-$      Formula 3

Here, L, $[L-H]^+$, Z and A are defined in the specification.

A catalyst composition including binuclear transition metal complexes, an alkylaluminum compound, and a salt compound including a Bronsted acid cation, and a noncoordinating, compatible anion, and a method of preparing the catalyst composition are provided.

15 Claims, No Drawings

CATALYST COMPOSITION INCLUDING TRANSITION METAL COMPLEXES AND OLEFIN POLYMERIZATION USING THE SAME

CROSS-REFERENCE TO RELATED PATENT APPLICATION

This application claims the benefit of Korean Patent Application No. 10-2006-0009824, filed on Feb. 1, 2006, in the Korean Intellectual Property Office, the disclosure of which is incorporated herein in its entirety by reference.

BACKGROUND OF THE INVENTION

1. Field of the Invention

The present invention relates to a catalyst composition including transition metal complexes effectively used in polymerization and olefin polymerization using the same.

2. Description of the Related Art

Dow Chemical Co. developed a catalyst known as a constrained geometry catalyst. European Patent No. 416,815 discloses a catalyst composition formed in the presence of an activating cocatalyst such as alkylalumoxane, aluminum alkyl, aluminum halide, and aluminum alkyl halide.

European Patent No. 418,044 (corresponding to U.S. Pat. No. 5,064,802) discloses a cationic constrained geometry metal catalyst formed by reacting a metal catalyst with a Bronsted acid salt including a noncoordinating, compatible anion. The catalyst composition has been commonly used in olefin polymerization. European Patent No. 520,732 (corresponding to U.S. Pat. No. 5,721,185) discloses a method of preparing a cationic constrained geometry catalyst by detaching anions using a borane compound which is a Lewis acid.

U.S. Pat. No. 5,399,635 discloses a cationic catalyst prepared by contacting a transition metal with a carbonium salt of a noncoordinating, compatible anion. The cationic catalyst was used in the polymerization of olefin. U.S. Pat. No. 5,453,410 discloses that a cationic catalyst composition was developed using an alumoxane and a cationic constrained geometry complex prepared by contacting a transition metal catalyst with a Lewis acid, and the activity of the catalyst was improved. It was described that trialkylaluminum compounds were not substantially effective in place of the alumoxane in Examples.

In the present invention, a method of preparing an effective catalyst composition and a method of polymerizing olefin using the catalyst composition are provided.

SUMMARY OF THE INVENTION

The present invention provides a catalyst composition including binuclear transition metal complexes.

The present invention also provides a method of preparing the catalyst composition.

The present invention also provides a method of preparing an olefin polymer using the catalyst composition.

The present invention also provides an olefin polymer according to the method of preparing olefin polymer using the catalyst composition.

According to an aspect of the present invention, there is provided a catalyst composition including:

a transition metal complex precatalyst represented by Formula 1;

a first cocatalyst represented by Formula 2 which is an alkylaluminum compound; and a second cocatalyst represented by Formula 3 which is a salt compound formed of a Bronsted acid cation and a noncoordinating, compatible anion.

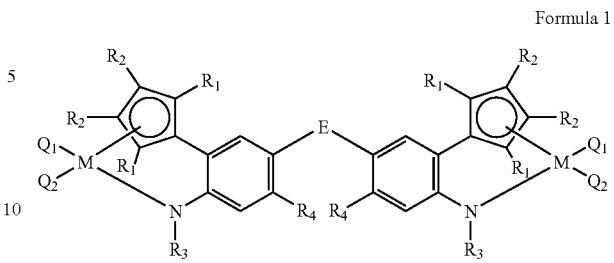

Formula 1

Here, $R_1$s and $R_2$s are each independently a hydrogen atom; a C1-20 alkyl, C6-20 aryl or C3-20 silyl radical; a C2-20 alkenyl, C7-20 alkylaryl, or C7-20 arylalkyl radical; or a metalloid radical of Group 14 substituted with a C1-60 hydrocarbyl, wherein $R_1$ and $R_2$ can be connected to each other by an alkylidine radical containing a C1-20 alkyl or C6-20 aryl radical to form a ring;

each of the $R_3$s are each independently a C1-20 alkyl, C6-20 aryl, or C3-20 silyl radical; a C2-20 alkenyl, C7-20 alkylaryl, or C7-20 arylalkyl radical; or a metalloid radical of Group 14 substituted with a C1-60 hydrocarbyl;

each of the $R_4$s are each independently a hydrogen atom; a halogen radical; or a C1-20 alkyl or C6-20 aryl radical, wherein two $R_4$s can be connected to each other;

E is a covalent bridging group connecting the two phenylene rings such as an O-group; an epithio group; a carbonyl group; a silane group; a disilane group; a substituted or unsubstituted C1-60 hydrocarbylene group; and a substituted or unsubstituted C1-60 heterohydrocarbylene group including Group 4B, 5B or 6B atom;

M is Ti, Zr or Hf which is a Group 4 transition metal; and $Q_1$s and $Q_2$s are each independently a halogen radical; a C1-20 alkyl, or arylamido radical; a C1-20 alkyl, C2-20 alkenyl, C6-20 aryl, C7-20 alkylaryl, or C7-20 arylalkyl radical; or a C1-20 alkylidene radical.

Formula 2

Here, $R_6$ is a C1-20 hydrocarbyl radical; C1-20 hydrocarbyl radical substituted with a halogen atom.

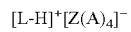

Formula 3

Here, L is a neutral Lewis base; $[L-H]^+$ is a Bronsted acid; Z is $B^{3+}$ or $Al^{3+}$; and A is a C6-20 aryl or C1-20 alkyl radical in which at least one hydrogen atom is substituted with a halogen atom, a C1-20 hydrocarbyl, C1-20 alkoxy or phenoxy radical.

The transition metal complex precatalyst in the catalyst composition may be represented by Formula 4.

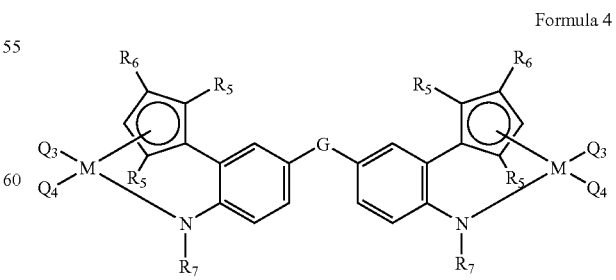

Formula 4

Here, $R_5$s and $R_6$s are each independently a hydrogen atom; or a C1-20 alkyl, C6-20 aryl or C3-20 silyl radical;

each of the $R_7$s are a C1-20 alkyl, C6-20 aryl, or C3-20 silyl radical; a C2-20 alkenyl, C7-20 alkylaryl or C7-20 arylalkyl radical;

$Q_3$s and $Q_4$s are each independently a halogen radical; a C1-20 alkyl or C6-20 arylamido radical; or a C1-20 alkyl radical;

G is an O-group; an epithio group; a carbonyl group; a C1-60 heterohydrocarbylene group substituted with a substituent having an oxygen or nitrogen atom; or —C($R_{41}$)$_2$—, wherein $R_{41}$ is a hydrogen atom or a C1-20 alkyl, C6-20 aryl, or C3-20 silyl radical; a C2-20 alkenyl, C7-20 alkylaryl, or C7-20 arylalkyl radical; or a metalloid radical of Group 14 substituted with a C1-60 hydrocarbyl, and M is described above.

The transition metal complex precatalyst in the catalyst composition may be represented by Formula 5.

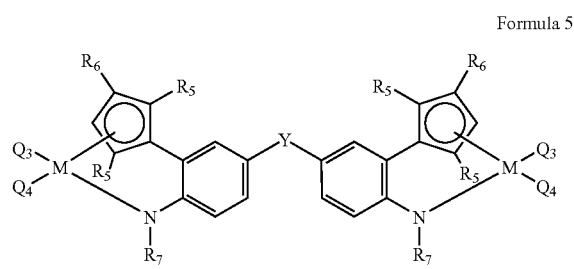

Formula 5

Here, Y is —CH$_2$—, —C(CH$_3$)$_2$—, —C(=O)—, —C(=NR$_8$)—, —O—, or —S—, wherein $R_8$ is a hydrogen atom or a C1-20 alkyl, C6-20 aryl, or C3-20 silyl radical; a C2-20 alkenyl, C7-20 alkylaryl or C7-20 arylalkyl radical;

$R_5$, $R_6$, $R_7$, $Q_3$, $Q_4$, and M are described above.

The transition metal complex precatalyst in the catalyst composition may be represented by one of the Formulae below.

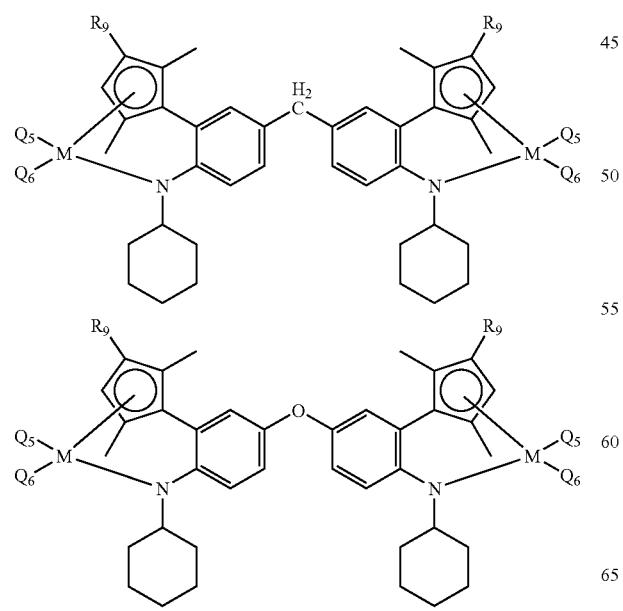

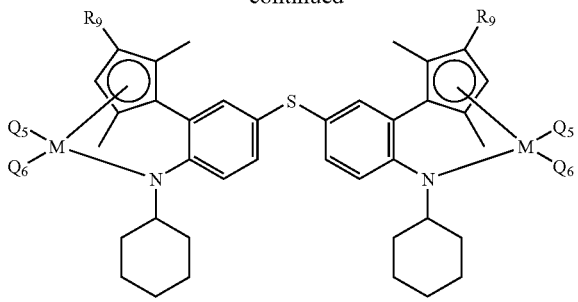

-continued

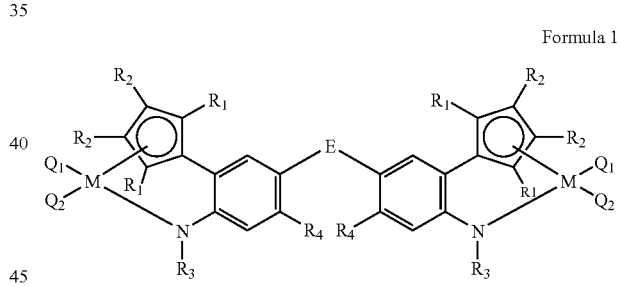

Here, $R_9$ is a hydrogen atom or a methyl radical, and $Q_5$s and $Q_6$s are each independently a methyl, a dimethylamido, a diethylamido or a chloride radical.

In the catalyst composition, the mol ratio of the transition metal of the precatalyst to the aluminum of the first cocatalyst may be in the range of 1:1 to 1:1000, and the mol ratio of the transition metal of the precatalyst to the boron or aluminum of the second cocatalyst may be in the range of 1:1 to 1:10.

The noncoordinating anon [ZA$_4$]$^-$ included in the salt compound which is the second cocatalyst may be B[C$_6$F$_5$]$_4^-$.

According to another aspect of the present invention, there is provided a method of preparing a catalyst composition, the method including:

contacting a transition metal complex precatalyst represented by Formula 1 with a first cocatalyst represented by Formula 2 to prepare a mixture; and contacting the mixture of the precatalyst and the first cocatalyst with a second cocatalyst represented by Formula 3.

Formula 1

Here, $R_1$, $R_2$, $R_3$, $R_4$, E, $Q_1$, $Q_2$ and M are described above.

Al(R$_6$)$_3$     Formula 2

Here, $R_6$ is described above.

[L-H]$^+$[Z(A)$_4$]$^-$     Formula 3

Here, L, [L-H]$^+$, Z and A are described above.

According to another aspect of the present invention, there is provided a method of preparing an olefin polymer by contacting the catalyst composition with monomers.

The monomer may be at least one of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

According to another aspect of the present invention, there is provided an olefin polymer prepared according to the method of preparing an olefin polymer using the catalyst composition.

The olefin polymer may be a copolymer formed from an ethylene monomer; and at least one monomer selected from the group consisting of propylene, 1-butene, 1-hexene, 4-methyl-1-pentene, 1-octene, stylene, ethylidene and norbornene.

The olefin polymer may have the density of 0.860 to 0.910 g/cm$^3$.

DETAILED DESCRIPTION OF THE INVENTION

Hereinafter, the present invention will be described in detail by explaining embodiments of the invention. The invention may, however, be embodied in many different forms and should not be construed as being limited to the embodiments set forth herein; rather, these embodiments are provided so that this disclosure will be thorough and complete, and will fully convey the concept of the invention to those skilled in the art.

The catalyst composition according to an embodiment of the present invention has excellent activity by including a binuclear transition metal complex having a novel structure. A polyolefin copolymer having a very low density less than 0.910 g/cc can be obtained by using the catalyst composition in the olefin polymerization.

A catalyst composition according to an embodiment of the present invention includes a transition metal complex precatalyst represented by Formula 1; a first cocatalyst represented by Formula 2 which is an alkylaluminum compound; and a second cocatalyst represented by Formula 3 which is a salt compound formed of a Bronsted acid cation and a noncoordinating, compatible anion.

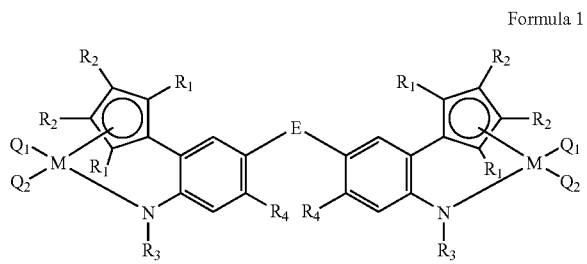

Formula 1

Here, $R_1$s and $R_2$s are each independently a hydrogen atom; a C1-20 alkyl, C6-20 aryl or C3-20 silyl radical; a C2-20 alkenyl, C7-20 alkylaryl, or C6-20 arylalkyl radical; or a metalloid radical of Group 14 substituted with a C1-60 hydrocarbyl, wherein $R_1$ and $R_2$ can be connected to each other by an alkylidine radical containing a C1-20 alkyl or C6-20 aryl radical to form a ring;

each of the $R_3$s are each independently a C1-20 alkyl, C6-20 aryl, or C3-20 silyl radical; a C2-20 alkenyl, C7-20 alkylaryl, or C7-20 arylalkyl radical; or a metalloid radical of Group 14 substituted with a C1-60 hydrocarbyl;

each of the $R_4$s are each independently a hydrogen atom; a halogen radical; or a C1-20 alkyl or C6-20 aryl radical, wherein two $R_4$s can be connected to each other;

E is a covalent bridging group connecting the two phenylene rings such as an O-group; an epithio group; a carbonyl group; a silane group; a disilane group; a substituted or unsubstituted C1-60 hydrocarbylene group; and a substituted or unsubstituted C1-60 heterohydrocarbylene group including Group 4B, 5B or 6B atom;

M is Ti, Zr or Hf which is a Group 4 transition metal; and $Q_1$s and $Q_2$s are each independently a halogen radical; a C1-20 alkyl, or arylamido radical; a C1-20 alkyl, C2-20 alkenyl, C6-20 aryl, C7-20 alkylaryl, or C 7-20 arylalkyl radical; or a C1-20 alkylidene radical.

Al(R$_6$)$_3$     Formula 2

Here, $R_6$ is a C1-20 hydrocarbyl radical; C1-20 hydrocarbyl radical substituted with a halogen atom.

[L-H]$^+$[ZA$_4$]$^-$     Formula 3

Here, L is a neutral Lewis base; [L-H]$^+$ is a Bronsted acid; Z is B$^{3+}$ or Al$^{3+}$; and A is a C6-20 aryl or C1-20 alkyl radical in which at least one hydrogen atom is substituted with a halogen atom, a C1-20 hydrocarbyl, C1-20 alkoxy or phenoxy radical.

The transition metal complex precatalyst represented by Formula 1 in the catalyst composition may be represented by Formula 4.

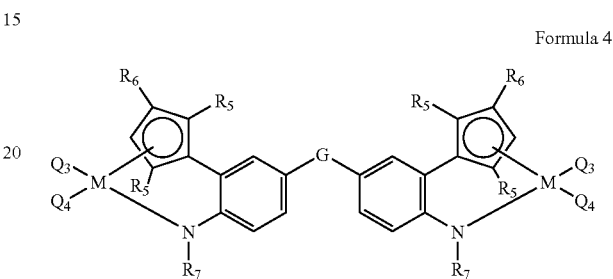

Formula 4

Here, $R_5$ and $R_6$ are each independently a hydrogen atom; or a C1-20 alkyl, C6-20 aryl or C3-20 silyl radical;

each of the $R_7$s are each independently a C1-20 alkyl, C6-20 aryl, or C3-20 silyl radical; or a C2-20 alkenyl, C7-20 alkylaryl or C7-20 arylalkyl radical;

$Q_3$s and $Q_4$s are each independently a halogen radical; a C1-20 alkyl or C6-20arylamido radical; or a C1-20 alkyl radical;

G is an —O-group; an epithio group; a carbonyl group; a C1-60 heterohydrocarbylene group substituted with a substituent having an oxygen or nitrogen atom; or —C(R$_{41}$)$_2$—, wherein R$_{41}$ is a hydrogen atom or a C1-20 alkyl, C6-20 aryl, or C3-20 silyl radical; a C2-20 alkenyl, C7-20 alkylaryl, or C7-20 arylalkyl radical; or a metalloid radical of Group 14 substituted with a C1-60 hydrocarbyl, and M is described above.

The transition metal complex precatalyst in the catalyst composition may be represented by Formula 5.

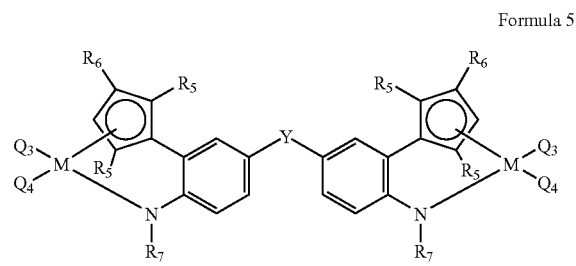

Formula 5

Here, Y is —CH$_2$—, —C(CH$_3$)$_2$—, —C(=O)—, —C(=NR$_8$)—, —O—, or —S—, wherein R$_8$ is a hydrogen atom or a C1-20 alkyl, C6-20 aryl, or C3-20 silyl radical; a C2-20 alkenyl, C7-20 alkylaryl or C7-20 arylalkyl radical; and $R_5$, $R_6$, $R_7$, $Q_3$, $Q_4$, and M are described above.

The transition metal complex precatalyst in the catalyst composition may be represented by one of Formulae below.

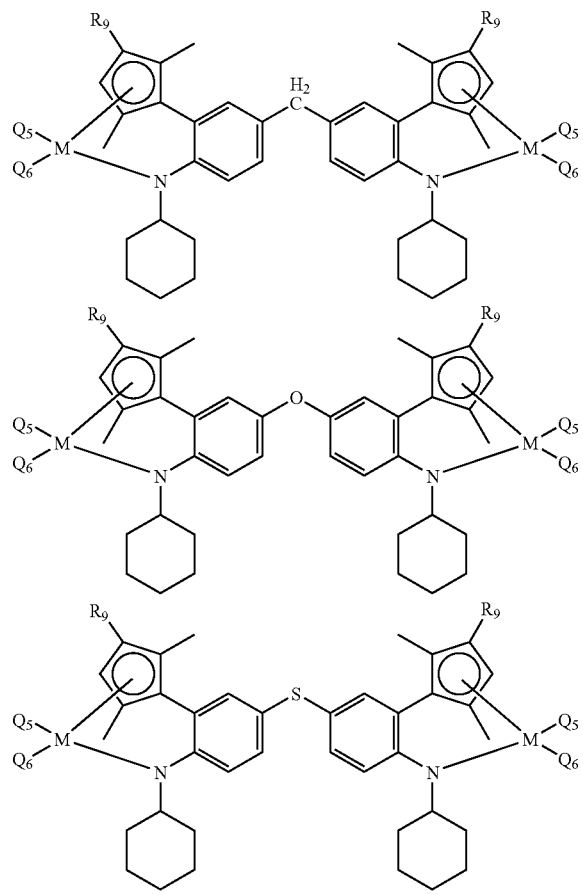

Here, $R_9$ is a hydrogen atom or a methyl radical, and $Q_5$s and $Q_6$s are each independently a methyl, a dimethylamido, a diethylamido or a chloride radical.

The first cocatalyst which is an alkyl metal compound represented by Formula 2 may be one of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyidimethylaluminum, methyldiethylaluminum, triphenylaluminum, and tri-p-tolylaluminum, and more preferably trimethylaluminum, triethylaluminum, and triisobutylaluminum, but is not limited thereto. Any alkylaluminum that is commonly used in the art may be used as the first cocatalyst.

The second cocatalyst represented by Formula 3 which is a salt compound includes a Bronsted acid cation and a noncoordinating, compatible anion. The anion may have a relatively large size and a single coordinating complex compound. In particular, a compound having a single boron atom at the anion site has been widely used. The salt may include an anion which has a coordinating complex compound having a single boron atom.

Examples of the salt compound may include trialkylammonium salt such as trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluoropenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyidimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl)borate, methyldidodecylammonium tetrakis(pentafluorophenyl)borate, methyiditetradecylammonium tetrakis(pentafluorophenyl)borate, methyldihexadecylammonium tetrakis(pentafluorophenyl)borate, methyidioctadecylammonium tetrakis(pentafluorophenyl)borate, methyidieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, and methyidi(dodecyl)ammonium tetrakis(pentafluorophenyl)borate;

dialkylammonium salt such as di-(i-propyl)ammonium tetrakis(pentafluorophenyl)borate, and dicyclohexylammonium tetrakis(pentafluorophenyl)borate; and a carbonium salt such as tropylium tetrakis(pentafluorophenyl)borate, triphenylmethylium tetrakis(pentafluorophenyl)borate, and benzene(diazonium) tetrakis(pentafluorophenyl)borate.

Particularly, the second cocatalyst may be N,N-dimethylanilinium tetrakis(pentafluorophenyl)borate, tributylammonium tetrakis(pentafluorophenyl)borate, di(octadecyl)methylammonium tetrakis(pentafluorophenyl)borate, di(octadecyl)(n-butyl)ammonium tetrakis(pentafluorophenyl)borate, triphenylmethylium tetrakis(pentafluorophenyl)borate, or tropylium tetrakis(pentafluorophenyl)borate.

In the catalyst composition, the mol ratio of the transition metal of the precatalyst to the aluminum of the first cocatalyst may be in the range of 1:1 to 1:1000, preferably 1:5 to 1:250, and more preferably 1:5 to 1:200. When the mol ratio is less than 1:1, the ability of the first cocatalyst is too low. On the other hand, when the mol ratio is greater than 1:1000, excess alkyl groups may remain without participating the reaction and poison the catalyst composition, and excess aluminum remains in the polymer.

The mol ratio of the transition metal of the precatalyst to the boron or aluminum of the second cocatalyst may be in the range of 1:1 to 1:10, and preferably 1:1 to 1:5. When the mol ratio is less than 1:1, the amount of the second cocatalyst is relatively low, the metal complex is not sufficiently activated, and thus the activity of the catalyst composition is low. On the other hand, when the mol ratio is greater than 1:10, the manufacturing costs for the catalyst composition increases although the activity of the catalyst composition increases.

Meanwhile, the noncoordinating anon $[ZA_4]^-$ included in the salt compound which is the second cocatalyst may be $B[C_6F_5]_4^-$.

It is considered that the catalyst composition is activated to be a cationic transition metal complex compound in which the anion of the second cocatalyst which is the salt compound is weakly coordinated to the transition metal complex precatalyst.

A method of preparing a catalyst composition according to an embodiment of the present invention includes: contacting a transition metal complex precatalyst represented by Formula 1 with a first cocatalyst represented by Formula 2 to prepare a mixture; and contacting the mixture of the precatalyst and the first cocatalyst with a second cocatalyst represented by Formula 3.

Formula 1

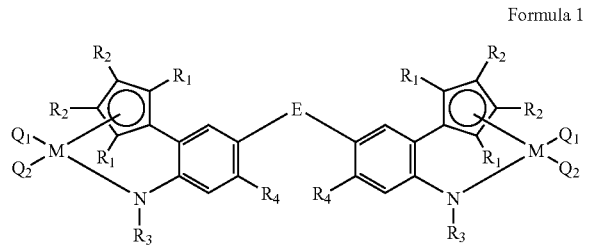

Here, $R_1$, $R_2$, $R_3$, $R_4$, E, $Q_1$, $Q_2$ and M are described above.

$Al(R_6)_3$      Formula 2

Here, $R_6$ is described above.

$[L-H]^+[ZA_4]^-$      Formula 3

Here, L, $[L-H]^+$, Z and A are described above.

Generally, the catalyst composition may be prepared by mixing the elements in an appropriate solvent at a temperature in the range of −100 to 300° C., and preferably 25 to 75° C. The solvent may be a hydrocarbon solvent such as pentane, hexane, or heptane, or an aromatic solvent such as benzene and toluene.

In the catalyst composition, the catalyst may be separately prepared in advance to be used or the catalyst composition may be prepared by binding the catalyst in the presence of monomers to be polymerized in the same reaction system. The catalyst may be separately prepared using an appropriated solvent in advance to be added to the polymerization reactor. Each of the elements is added following the sequence described in this specification to obtain the catalyst composition. The catalyst and the catalyst composition are treated under an inert atmosphere such as nitrogen and argon since they are sensitive to moisture and oxygen.

A method of preparing an olefin polymer by contacting the catalyst composition according to an embodiment of the present invention with monomers is provided.

A polymerization process using the catalyst composition may be a solution process, but when the catalyst composition is used together with an inorganic support, such as silica, the polymerization process can also be a slurry or vapor process.

In the method of polymerizing olefin, the catalyst composition can be dissolved or diluted in a solvent suitable for olefin polymerization, before being used. The solvent can be a C5-C12 aliphatic hydrocarbon solvent, such as pentane, hexane, heptane, nonane, decane, and isomers of these; an aromatic hydrocarbon, such as toluene and benzene; or a hydrocarbon solvent that is substituted with a chloride atom, such as dichloromethane and chlorobenzene. The solvent used therein may be treated with a small amount of alkylaluminum to remove water or air, which acts as a catalyst poison.

A reaction solvent used in the polymerization may be an inert liquid, for example hydrocarbon solvent such as isobutene, butane, pentane, hexane, heptane, octane and a mixture thereof, and an aromatic solvent such as benzene and toluene.

Examples of the olefin-based monomer which is polymerized using the catalyst composition may include ethylene, α-olefin and a cyclic olefin. A diene olefin-based monomer or a triene olefin-based monomer which have at least two double bonds may also be polymerized. Examples of the monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-itocene, norbornene, norbornadiene, ethylidene norbornene, phenylnorbornene, vinyl norbornene, dicyclopentadiene, 1,4-butadiene, 1,5-pentadiene, 1,6-hexadiene, styrene, α-methylstyrene, divinylbenzene, and 3-chloromethyl styrene. More than two of the monomers may be mixed and copolymerized.

An olefin polymer is prepared according to a method of preparing an olefin polymer. The olefin polymer may be a copolymer formed from an ethylene monomer; and at least one monomer selected from the group consisting of propylene, 1-butene, 1-hexene, 4-methyl-1-pentene, 1-octene, styrene, ethylidene and norbornene.

The copolymer has a high molecular weight and a very low density less than 0.910 g/cc. More preferably, the olefin polymer may have the density of 0.860 to 0.910 g/cm$^3$.

The present invention will be described in greater detail with reference to the following examples. The following examples are for illustrative purposes only and are not intended to limit the scope of the invention.

Synthesis of Ligands and Metal Complexes

Organic reagents and solvents were obtained from Aldrich Co., Inc. and Merck Co., Inc. and purified using a standard method. Each process for the synthesis was performed while isolated from air and moisture to improve reproducibility of experiments. The structure of compounds produced in the following examples was identified using a 400 MHz nuclear magnetic resonance (NMR) and an X-ray spectrometer.

PREPARATION EXAMPLE 1

4-(4-(cyclohexylamino)benzyl)-N-cyclohexylbenzeneamine (Compound 1)

30 ml of toluene was added to 4.000 g (20.175 mmol) of 4,4-methylenedianiline, 15.839 g (161.396 mmol) of cyclohexanone, and 10.0 g of molecular sieves (4 Å). The mixture was reacted at 100° C. for 2 days. The mixture was cooled to room temperature, molecular sieves were filtered, and dried in a vacuum at 60° C. to prepare 4-(4-(cyclohexylideneamino)benzyl)-N-cyclohexylidenebenzeneamine. The obtained product was dissolved in 60 ml of methanol, 4.576 g (121.047 mmol) of sodium borohydride was added thereto, and the mixture was reacted at room temperature for 2 hours. Then, the mixture was neutralized with 80 ml of 1 N KOH. An aqueous layer was extracted twice with 60 ml of M.C, and dried with $MgSO_4$. Then, the obtained product was recrystallized in hexane and ethylacetate. As a result, 3.765 g of white solid product (Compound 1) was obtained (Yield: 51%).

$^1$H NMR ($CDCl_3$): d 6.94 (d, 4H, Ph), d 6.49(d, 4H, Ph), d 3.72(s, 2H, $CH_2$), d 3.37(s, 2H, NH), d 3.19(m, 2H, $CH^{Cy}$), d 2.02(m, 4H, $CH_2^{Cy}$), d 1.72(m, 4H, $CH_2^{Cy}$), d 1.57(m, 2H, $CH_2^{Cy}$), d 1.33(m, 4H, $CH_2^{Cy}$), d 1.21(m, 2H, $CH_2^{Cy}$) d 1.12(m, 4H, $CH_2^{Cy}$)

PREPARATION EXAMPLE 2

4-(3-bromo-4-(cyclohexylamino)benzyl)-2-bromo-N-cyclohexylbenzeneamine (Compound 2)

1.500 g (4.137 mmol) of Compound 1 was dissolved in 15 ml of M.C and the mixture was cooled to 0° C. 1.322 ml (8.275 mol) $Br_2$ dissolved in 10 ml of M.C was gradually added to the mixture at 0° C. for 30 minutes and the mixture was further reacted for 2 hours. 10 ml of 1 N KOH was added thereto, and then an aqueous layer was extracted with 40 ml of M.C, and dried with $MgSO_4$. Then, the obtained product was refined using a column chromatography with hexane and ethylacetate (v/v, 20:1). As a result, 1.523 g of white solid product (Compound 2) was obtained (Yield: 71%).

$^1$H NMR ($C_6D_6$): d 7.35(d, 2H, Ph), d 6.89(dd, 2H, Ph), d 6.45(d, 2H, Ph), d 4.22(d, 2H, NH), d 3.54(s, 2H, CH2), d 3.04(m, 2H, $CH^{Cy}$), d 1.80(m, 4H, $CH_2^{Cy}$), d 1.52(m, 4H, $CH_2^{Cy}$), d 1.41(m, 2H, $CH_2^{Cy}$), d 1.16-0,93(m, 10H, $CH_2^{Cy}$).
$^{13}$C NMR ($C_6D_6$): 142.74, 133.04, 130.86, 129.14, 112.29, 110.28, 51.81, 39.78, 33.31, 26.25, 25.17

PREPARATION EXAMPLE 3

4-(3-(3,4-dimethylcyclopenta-1,3-dienone)-4-(cyclohexylamino)benzyl)-2-(3,4-dimethylcyclopenta-1,3-dienone)-N-cyclohexylbenzeneamine (Compound 3)

0.857 g (5.565 mmol) of boronic acid, 0.843 g (7.951 mmol) of $Na_2CO_3$, 0.123 g (0.106 mmol) of $Pd(PPh_3)_4$ and 1.379 g (2.650 mmol) of Compound 2 were dissolved in 12 ml DME and 4 ml of water, and the mixture was reacted at 95° C. for 40 hours. The reaction mixture was cooled to room temperature, an organic layer was extracted with 30 ml of ethylacetate, and the obtained solution was dried with $MgSO_4$. Then, the obtained product was refined using a column chromatography with hexane and ethylacetate (v/v, 3:1). As a result, 1.206 g of yellow solid product (Compound 2) was obtained (Yield: 79%).

$^1$H NMR ($CDCl_3$): d 6.96(dd, 2H, Ph), d 6.64(d, 2H, Ph), d 6.60(d, 2H, Ph), d 3.73(s, 2H, $CH_2$), d 3.32(s, 2H, NH), d 3.19(m, 2H, $CH^{Cy}$), d 2.87(m, 2H, CH), d 2.74(dd, 2H, $CH_2$), d 2.11(dd, 2H, $CH_2$), d 1.95(m, 4H, $CH_2^{Cy}$), d 1.93(s, 6H, Me), d 1.67(m, 4H, $CH_2^{Cy}$), d 1.57(m, 2H, $CH_2^{Cy}$), d 1.36-1.03(m, 10H, $CH_2^{Cy}$), d 1.25(d, 6H, Me).

PREPARATION EXAMPLE 4

4-(3-(2,3,5-trimethylcyclopenta-1,3-diene)-4-(cyclohexylamino)benzyl)-2-(2,3,5,-trimethylcyclopenta-1,3-diene)-N-cyclohexylbenzeneamine (Compound 4)

3.744 g (15.203 mmol) of anhydrous $CeCl_3$ was dissolved in 30 ml of THF and the mixture was cooled to −78° C. 9.502 mL (15.203 mmol) of MeLi (1.6 M solution in diethyl ether w/o LiBr) was gradually added thereto and the mixture was reacted at −78° C. for 1 hour. 1.100 g (1.900 mmol) of Compound 3 was added thereto and the mixture was further reacted at −78° C. for 2 hours. 30 ml of $H_2O$ and 40 ml of ethylacetate were added thereto, and an organic layer was extracted. HCl was added thereto and the mixture was reacted for 2 minutes, the mixture was neutralized with $NaHCO_3$, and the obtained organic layer was dried with $MgSO_4$. The obtained oil was refined using a column chromatography with hexane and ethylacetate (v/v, 20:1). As a result, 0.502 g of white oil was obtained (Yield: 46%).

$^1$H NMR ($CDCl_3$): d 6.95(dd, 2H, Ph), d 6.70(d, 2H, Ph), d 6.55(d, 2H, Ph), d 3.74(s, 2H, $CH_2$), d 3.43(d, 2H, NH), d 3.20(m, 2H, $CH^{Cy}$), d 2.86(qd, 4H, $CH_2$), d 1.96(m, 4H, $CH_2^{Cy}$), d 1.91 (s, 6H, Me), d 1.76(s, 6H, Me), d 1.70-1.54(m, 6H, $CH_2^{Cy}$), d 1.54(s, 6H, Me), d 1.30(m, 4H, $CH_2^{Cy}$), d 1.16(m, 2H, $CH_2^{Cy}$), d 1.01(m, 4H, $CH_2^{Cy}$).

PREPARATION EXAMPLE 5

4-(3-(2,3,5-trimethylcyclopentadienyl)-4-(cyclohexylamido)benzyl)-2-(2,3,5-trimethylcyclopentadienyl)-N-cyclohexylbenzeneamido tetralithium salt (Compound 5)

0.390 g (0.68 mmol) of Compound 4 was dissolved in 4 mL of cold diethylether at −30° C.) and 1.140 mL of n-BuLi (2.85 mmol, 2.5 M in hexane) was gradually added thereto and the mixture was reacted for 12 hours. Pale yellow precipitate was filtered and washed with 12 mL of pentane to obtain white solid product (Compound 5) (Yield: 100%). As a result of $^1$H and $^{13}$C NMR spectroscopy, it was identified that a tetralithium salt was obtained and 0.58 diethylether was coexisted.

$^1$H NMR ($C_6D_6+^dPy$): d 1.14-1.26 (m, 6H, Cy-$CH_2$), 1.36-1.51 (m, 4H, Cy-$CH_2$),1.54-1.62 (m, 4H, Cy-$CH_2$), 1.63-1.74 (m, 6H, Cy-$CH_2$), 1.90 (s, 6H, $CH_3$), 2.14 (s, 6H, $CH_3$), 2.38 (s, 6H, $CH_3$), 3.37-3.44 (m, 2H, N—CH), 4.23 (s, 2H, bridged-$CH_2$), 5.86 (s, 2H, Cp-H), 6.61 (d, J=5.6 Hz, 2H, $C_6H_3$—CH), 7.36 (br s, 2H, $C_6H_3$—CH), 7.46 (s, 2H, $C_6H_3$—CH) ppm.

PREPARATION EXAMPLE 6

Methylidene-bis(3,4-phenylene(cyclohexylamido)(2,3,5-trimethylcyclopentadienyl)-titanium dimethyl) (Compound 6)

0.644 g (2.30 mmol) of $TiCl_4DME$ was dissolved in 16 mL diethylether, and left sat at −30° C. for 30 minutes. 2.106 g of MeLi (4.60 mmol, 1.6 M in diethyl ether w/o LiBr) was gradually added thereto for 15 minutes. 0.800 g (1.15 mmol) of Compound 5 was added thereto and the mixture was reacted at room temperature for 3 hours. All of the solvents were dried in a vacuum, and the mixture was extracted with 25 mL of pentane to obtain 0.670 g of red oil (Compound 6) (Yield: 88%).

$^1$H NMR ($C_6D_6$): d 0.47 (br s, 6H, Ti—$CH_3$), 0.61 (br s, 6H, Ti—$CH_3$), 1.03-1.17 (m, 2H, Cy-$CH_2$), 1.40-1.53 (m, 3H, Cy-$CH_2$), 1.56 (s, 6H, $CH_3$), 1.67 (s, 6H, $CH_3$), 1.80-1.88 (m, 6H, Cy-$CH_2$), 1.90-2.04 (m, 3H, Cy-$CH_2$), 2.13 (s, 6H, $CH_3$), 2.27-2.39 (m, 6H, Cy-$CH_2$), 3.95 (s, 2H, bridged-$CH_2$), 5.89 (br s, 2H, N—CH), 6.10 (s, 2H, Cp-H), 6.70 (br s, 2H, $C_6H_3$—CH), 7.07 (s, 2H, $C_6H_3$—CH), 7.12 (d, J=5.6 Hz, 2H, $C_6H_3$—CH) ppm, $^{13}$C{$^1$H} NMR ($C_6D_6$): d 11.82, 13.89, 14.13, 26.39, 27.96, 30.63, 41.07, 44.25, 47.91, 56.48, 108.37, 110.66, 112.85, 122.12, 129.93, 132.12, 133.42, 135.68, 136.30, 160.25 ppm.

PREPARATION EXAMPLE 7

Methylidene-bis(3,4-phenyllene(cyclohexylamido) (2,3,5-trimethylcyclopentadienyl)-titanium dichloride) (Compound 7)

1.481 g (2.58 mmol) of Compound 4, 1.271 g (5.67 mmol) of Ti(NMe$_2$)$_4$ and 15 mL of toluene were mixed and the mixture was reacted at 80° C. for 2 days. The solvents were removed and the mixture was extracted with pentane to obtain red oil.

$^1$H NMR (C$_6$D$_6$): d 0.88-0.99 (m, 2H, Cy-CH$_2$), 1.13-1.26 (m, 4H, Cy-CH$_2$), 1.36-1.49 (m, 6H, Cy-CH$_2$), 1.63-1.74 (m, 4H, Cy-CH$_2$), 1.80 (s, 6H, CH$_3$), 1.89 (s, 6H, CH$_3$), 1.97 (s, 6H, CH$_3$), 2.02-2.17 (m, 4H, Cy-CH$_2$), 2.91 (s, 12H, Ti(NMe$_2$)$_2$), 3.13 (s, 12H, Ti(NMe$_2$)$_2$), 4.08 (s, 2H, bridged-CH$_2$), 5.66 (s, 2H, Cp-H), 6.75 (br s, 2H, C$_6$H$_3$—CH), 7.20 (s, 2H, C$_6$H$_3$—CH), 7.23 (d, J=8.4 Hz, 2H, C$_6$H$_3$—CH) ppm.

The obtained bis(dimethylamido)titanium was dissolved in 15 mL toluene, and 1.996 g (15.46 mmol) of Me$_2$SiCl$_2$ was added thereto. The mixture was reacted at room temperature for 4 hours. All of the solvents were dried in a vacuum, and the mixture was extracted with pentane to obtain 1.808 g of red solid product (Yield: 87%).

$^1$H NMR (C$_6$D$_6$): d 0.91-0.97 (m, 2H, Cy-CH$_2$), 1.40-1.52 (m, 6H, Cy-CH$_2$), 1.68-1.75 (m, 3H, Cy-CH$_2$), 1.70 (s, 6H, CH$_3$), 1.82 (s, 6H, CH$_3$), 1.89-2.00 (m, 6H, Cy-CH$_2$), 2.06-2.18 (m, 3H, Cy-CH$_2$), 2.13 (s, 6H, CH$_3$), 3.95 (s, 2H, bridged-CH$_2$), 5.50-5.61 (m, 2H, N—CH), 6.10 (s, 2H, Cp-H), 6.68 (d, J=8.0 Hz, 2H, C$_6$H$_3$—CH), 7.04 (s, 2H, C$_6$H$_3$—CH), 7.09 (d, J=8.0 Hz, 2H, C$_6$H$_3$—CH) ppm, $^{13}$C{$^1$H}NMR (C$_6$D$_6$): d 12.76, 44.80, 15.17, 26.09, 27.36, 27.88, 27.95, 59.87, 110.94, 118.52, 128.87, 129.53, 131.59, 132.76, 136.41, 141.80, 142.57, 143.03, 162.45 ppm.

Preparation of Catalyst Composition and Polymerization of Olefin

Organic reagents and solvents were obtained from Aldrich Co., Inc. and purified using a standard method. Ethylene was obtained from Applied Gas Technology and used in the polymerization process after filtering oxygen and moisture in ethylene. Each process for the synthesis, dilution and polymerization was performed while isolated from air and moisture to improve reproducibility of experiments.

Meanwhile, the structure of the catalyst composition was identified using a 300 MHz nuclear magnetic resonance (NMR) (Bruker) and the molecular weight and polydispersity index (PDI) were identified using a gel permeation chromatography (GPC) with 150CV+ produced by Waters Co. Ltd. The GPC was performed at 140☐ with trichlorobenzene (trichlorobenzene), and the number-average molecular weight (M$_n$) and the weight-average molecular weight (M$_w$) were determined using polystyrene standard. The PDI was calculated by dividing the M$_w$ by M$_n$.

A melt index (MI) of a polymer was measured using ASTM D-1238 (Condition E, 190° C., 2.16 Kg weight). In order to measure the density of the polymer, a sample that had been treated with 1,000 ppm of an antioxidant using ASTM D-792 was formed into a sheet having a thickness of 3 mm and a diameter of 2 cm by a 180° C press mold, and then the prepared sheet was cooled to 10° C./min. The cooled sheet was measured using a Mettler scale.

Preparation of Catalyst Composition

EXAMPLE 1

Methylidene-bis(3,4-phenylene(cyclohexylamido)(2,3,5-trimethylcyclopentadienyl)-titanium dimethyl) which is a transition metal complex prepared according to Preparation Example 6 was put into a 100 ml of glass container in a glove box filled with argon, and dissolved in hexane to prepare a 0.001 M solution. Triisobutylaluminum in an amount of 25 times moles of titanium was added to the transition metal complex solution while stirring. Di(octadecyl)methylammonium tetrakis(pentafluorophenyl)borate was put into another 100 ml glass container, and dissolved in hexane to prepare a 0.001 M solution.

The organic metal catalyst solution including aluminum and the cocatalyst solution were injected with a syringe into a catalyst injecting cylinder of a polymerization reactor and they were injected into the reactor after 1 minute to be used in a polymerization.

EXAMPLE 2

A catalyst composition was prepared in the same manner as in Example 1, except that triisobutylaluminum in an amount of 50 times moles, instead of 25 times moles, of titanium was added to an organic metal compound.

EXAMPLE 3

A catalyst composition was prepared in the same manner as in Example 1, except that N,N-dimethylanilinium tetrakis(pentafluorophenyl)borate was used as the second cocatalyst instead of di(octadecyl)methylammonium tetrakis(pentafluorophenyl)borate, and toluene instead of hexane was used as the solvent diluting the cocatalyst.

EXAMPLE 4

A catalyst composition was prepared in the same manner as in Example 1, except that triphenylmethylium tetrakis(pentafluorophenyl)borate was used as the second cocatalyst instead of di(octadecyl)methylammonium tetrakis(pentafluorophenyl)borate, and toluene instead of hexane was used as the solvent diluting the cocatalyst.

COMPARATIVE EXAMPLE 1 methylidene-bis(3,4-phenylene(cyclohexylamido)(2,3,5-trimethylcyclopentadienyl)-titanium dimethyl) which is a transition metal complex prepared according to Preparation Example 6 was put into a 100 ml of glass container in a glove box filled with argon, and dissolved in hexane to prepare a 0.001 M solution. Di(octadecyl)methylammonium tetrakis (pentafluorophenyl)borate was put into another 100 ml glass container, and dissolved in hexane to prepare a 0.001 M solution.

The transition metal complex solution without aluminum (the first cocatalyst) and the second cocatalyst solution were injected with a syringe into a catalyst injecting cylinder of a polymerization reactor and they were injected into the reactor after 1 minute to be used in a polymerization.

COMPARATIVE EXAMPLE 2

Methylidene-bis(3,4-phenylene(cyclohexylamido)(2,3,5-trimethylcyclopentadienyl)-titanium dimethyl) which is a transition metal complex prepared according to Preparation Example 6 was put into a 100 ml of glass container in a glove box filled with argon, and dissolved in hexane to prepare a 0.001 M solution. Di(octadecyl)methylammonium tetrakis (pentafluorophenyl)borate was put into another 100 ml glass container, and dissolved in hexane to prepare a 0.001 M solution.

The transition metal precatalyst solution, the second cocatalyst solution, and triisobutylalunimum in an amount of 25 times moles of titanium (the first cocatalyst) were sequentially injected into a catalyst injecting cylinder of a reactor and they were injected into the reactor after 1 minute to be used in a polymerization.

COMPARATIVE EXAMPLE 3

A catalyst composition was prepared in the same manner as in Example 1, except that triisobutylaluminum in an amount of 250 times moles, instead of 25 times moles, of titanium was added to a transition metal compound.
Polymerization of Olefin 1
1.0 L of hexane solvent and 1.2 M 1-octene comonomer were added to a 2 L autoclave reactor. The reactor was heated to 90° C. in which the polymerization was performed, and the reactor was filled with 500 psi of ethylene. The catalyst compositions prepared according to Example 1 through 4 and Comparative Examples 1 through 3 were added to a catalyst injecting cylinder and injected into the reactor. Polymerization was performed for 10 minutes by continuously injecting ethylene in order to maintain the pressure of the reactor between 480 to 500 psi. Heat generated from the reaction was removed through cooling coil installed in the reactor and the temperature was maintained as constant as possible. After the polymerization, the polymer solution was discharged to the lower portion of the reactor and cooled using excess ethanol. The obtained polymer was dried for over 12 hours in a conventional oven. The results are presented in Table 1.

TABLE 1

| | Ti (mol) | Al:Ti[a] | B (mol) | Weight of polymer (g) | Activity (Kg/mmol-Ti hr) |
|---|---|---|---|---|---|
| Example 1 | 2 | 25 | 4 | 52.7 | 158.1 |
| Example 2 | 2 | 50 | 4 | 47.5 | 142.5 |
| Example 3 | 2 | 25 | 4 | 51.4 | 154.2 |
| Example 4 | 2 | 25 | 4 | 58.7 | 176.1 |
| Comparative Example 1 | 2 | 0 | 4 | 12.6 | 37.8 |
| Comparative Example 2 | 2 | 25 | 4 | 17.6 | 52.8 |
| Comparative Example 3 | 2 | 250 | 4 | 15.1 | 45.3 |

[a]mol ratio of aluminum to titanium

As shown in Table 1, a degree of polymerization activity of the catalyst composition of Examples 1 through 4 of the present invention was higher compared to Comparative Examples 1 through 3. As shown in Comparative Example 1, when the Lewis acid (the first cocatalyst) was not contacted with the organic metal precatalyst, the yield of the polymer decreased. Further, as shown in Comapartive Example 2, when the contact sequence among the precatalyst, the first cocatalyst and the second cocatalyst was changed, the yield of the polymer decreased. In Comparative Example 3, it was identified that the polymerization was not effective when excess Al was used due to too high mol ratio of Ti:A.

EXAMPLE 5

A predetermined amount of methylidene-bis(3,4-phenylene(cyclohexylamido)(2,3,5-trimethylcyclopentadienyl)-titanium dimethyl) which is a transition metal complex prepared according to Preparation Example 6 was put into a 100 ml of glass container in a glove box filled with argon, and dissolved in hexane to prepare a 0.001 M solution. Triisobutylaluminum in an amount of 25 times moles of titanium was added to the transition metal complex solution while stirring. Di(octadecyl)methylammonium tetrakis(pentafluorophenyl) borate was put into another 100 ml glass container, and dissolved in hexane to prepare a 0.001 M solution. The transition metal complex solution including aluminum in an amount of 2 moles of titanium and the second cocatalyst solution in an amount of 2 moles of boron were injected with a syringe into a catalyst injecting cylinder of a polymerization reactor to prepare a catalyst composition.
1.0 L of hexane solvent and 1.2 M 1-octene comonomer were added to a 2 L autoclave reactor. The reactor was heated to a polymerization temperature, and the reactor was filled with 500 psi of ethylene. The prepared catalyst compositions were added to a catalyst injecting cylinder and injected into the reactor. Polymerization was performed for 10 minutes by continuously injecting ethylene in order to maintain the pressure of the reactor between 480 to 500 psi. Heat generated from the reaction was removed through cooling coil installed in the reactor and the temperature was constantly maintained at 70° C.
After the polymerization, the polymer solution was discharged to the lower portion of the reactor and cooled using excess ethanol. The obtained polymer was dried for over 12 hours in a conventional oven. The results are presented in Table 2.

EXAMPLE 6

Polymerization was performed in the same manner as in Example 5, except that the polymerization temperature was maintained at 90° C.

EXAMPLE 7

Polymerization was performed in the same manner as in Example 5, except that the polymerization temperature was maintained at 120° C.

EXAMPLE 8

Polymerization was performed in the same manner as in Example 5, except that the polymerization temperature was maintained at 140° C.

COMPARATIVE EXAMPLE 4

An olefin polymer was prepared in the same manner as in Example 6, except that (t-butylamido)dimethyl(tetramethyl-$^5$-cyclopentadienyl)silane titanium dimethyl($CH_3$)$_2$Si [$C_5(CH_3)_4$]N(C($CH_3$)$_3$)]Ti($CH_3$)$_2$) was used as the precatalyst. The results are shown in Table 2.

COMPARATIVE EXAMPLE 5

Polymerization was performed in the same manner as in Comparative Example 4, except that the polymerization temperature was maintained at 120° C.

COMPARATIVE EXAMPLE 6

Polymerization was performed in the same manner as in Comparative Example 4, except that the polymerization temperature was maintained at 140° C.

TABLE 2

|  | Temperature (°C.) | Weight of polymer (g) | Activity (Kg/mmol-Ti hr) | Melt index[a] (g/10 min) | Melt index[b] (g/10 min) | Density (g/cc) |
|---|---|---|---|---|---|---|
| Example 5 | 70 | 98.31 | 294.9 | 0 | 0 | 0.882 |
| Example 6 | 90 | 52.36 | 157.1 | 0 | 0 | 0.880 |
| Example 7 | 120 | 46.14 | 138.4 | 0 | 0.455 | 0.878 |
| Example 8 | 140 | 22.65 | 68.0 | 0.05 | 1.646 | 0.877 |
| Comparative Example 4 | 90 | 47.40 | 142.2 | 0 | 1.25 | 0.879 |
| Comparative Example 5 | 120 | 96.02 | 288.0 | 0.53 | 13.7 | 0.886 |
| Comparative Example 6 | 140 | 51.65 | 155.0 | 3.05 | 60.94 | 0.892 |

[a] $I_2$ value,
[b] $I_{21.6}$ value

As shown in Table 2, the activity of the catalyst composition of Examples of the present invention was higher at a low temperature compared to Comparative Examples. Further, the catalyst composition of Examples of the present invention had higher copolymerization activity by showing relatively low density at all temperature range under same conditions compared to Comparative Examples. Particularly, the copolymerization activity increased since the density decreased as the temperature increased in the same concentration of octene.

Since the catalyst composition including a binuclear transition metal complex according to the present invention can be used to prepare copolymers having lower density than conventional CGC structure, the catalyst composition can be effectively used for a copolymer including olefin monomers having structural inherence such as 1-octene.

According to the present invention, a catalyst composition including binuclear transition metal complexes, an alkylaluminum compound, and a salt compound including a Bronsted acid cation, and a noncoordinating, compatible anion, and a method of preparing the catalyst composition are provided. The activity of the catalyst composition has been improved. The catalyst composition can be effectively used for copolymerization of ethylene with monomers having structural inherence, and a polyolefin copolymer having a very low density less than 0.910 g/cc can be obtained by using the catalyst composition.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A catalyst composition comprising:
a transition metal complex precatalyst represented by Formula 1;
a first cocatalyst represented by Formula 2 which is an alkylaluminum compound; and
a second cocatalyst represented by Formula 3 which is a salt compound comprising a Bronsted acid cation and a noncoordinating, compatible anion;

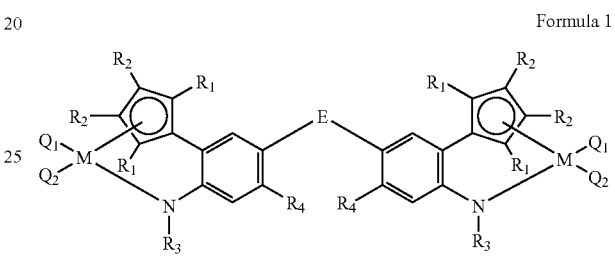

Formula 1 where, $R_1$s and $R_2$s are each independently a hydrogen atom; a C1-20 alkyl, C6-20 aryl or C3-20 silyl radical; a C2-20 alkenyl, C7-20 alkylaryl, or C7-20 arylalkyl radical; or a metalloid radical of Group 14 substituted with a hydrocarbyl, wherein $R_1$ and $R_2$ can be connected to each other by an alkylidine radical containing a C1-20 alkyl or aryl radical to form a ring;

$R_3$s are each independently a C1-20 alkyl, C6-20 aryl, or C3-20 silyl radical; a C2-20 alkenyl, C7-20 alkylaryl, or C7-20 arylalkyl radical; or a metalloid radical of Group 14 substituted with a C1-60 hydrocarbyl;

$R_4$s are each independently a hydrogen atom; a halogen radical; or a C 1-20 alkyl or C6-20 aryl radical, wherein two $R_4$s can be connected to each other;

E is a covalent bridging group connecting the two phenylene rings that is selected from the group consisting of —O—; an epithio group; a carbonyl group; a silane group; a disilane group; a substituted or unsubstituted C1-60 hydrocarbylene group; and a substituted or unsubstituted C1-60 heterohydrocarbylene group including Group 4B,5B or 6B atom;

M is Ti, Zr or Hf; and $Q_1$s and $Q_2$s are each independently a halogen radical; a C1-20 alkyl, or C6-20 arylamido radical; a C1-20 alkyl, C2-20 alkenyl, C6-20 aryl, C7-20 alkylaryl, or C7-20 arylalkyl radical; or a C1-20 alkylidene radical;

                                                                Formula 2 where, $R_6$ is a C1-20 hydrocarbyl radical; C1-20 hydrocarbyl radical substituted with a halogen atom; and

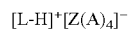                                                                Formula 3 where, L is a neutral Lewis base; [L-H]+ is a Bronsted acid; Z is B or Al; and A is a C6-20 aryl or C1-20 alkyl radical in which at least one hydrogen atom is substituted with a halogen atom, a C1-20 hydrocarbyl, C1-20 alkoxy or phenoxy radical.

2. The catalyst composition of claim 1, wherein the transition metal complex precatalyst is represented by Formula 4:

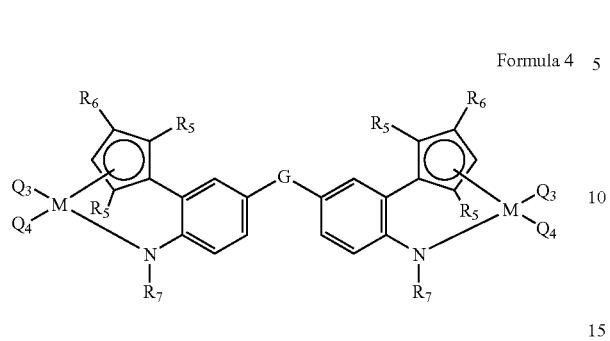

Formula 4 where, $R_5$ and $R_6$ are each independently a hydrogen atom; or a C1-20 alkyl, C6-20 aryl or C3-20 silyl radical;

$R_7$s are each independently a C1-20 alkyl, C6-20 aryl, or C3-20 silyl radical; a C2-20 alkenyl, C7-20 alkylaryl or C7-20 arylalkyl radical;

$Q_3$s and $Q_4$s are each independently a halogen radical; a C1-20 alkyl or C6-20 arylamido radical; or a C1-20 alkyl radical;

G is an —O— group; an epithio group; a carbonyl group; a C1-60 heterohydrocarbylene group substituted with a substituent having an oxygen or nitrogen atom; or —C($R_{41}$)$_2$—, wherein $R_{41}$ is a hydrogen atom or a C1-20 alkyl, C6-20 aryl, or C3-20 silyl radical; a C2-20 alkenyl, C7-20 alkylaryl, or C7-20 arylalkyl radical; or a metalloid radical of Group 14 substituted with a C1-60 hydrocarbyl; and M is Ti, Zr or Hf.

3. The catalyst composition of claim 1, wherein the transition metal complex precatalyst is represented by Formula 5:

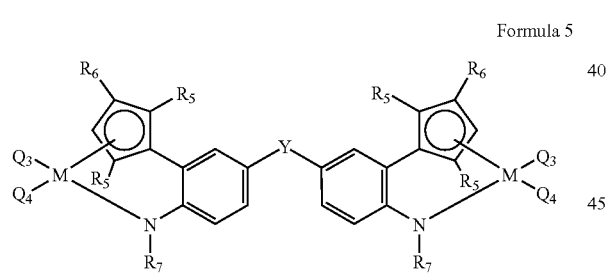

Formula 5 where, Y is —CH$_2$—, —C(CH$_3$)$_2$—, —C(=O)—, —C(=NR$_8$)—, —O—, or —S—, wherein $R_8$ is a hydrogen atom or a C1-20 alkyl, C6-20 aryl, or C3-20 silyl radical; a C2-20 alkenyl, C7-20 alkylaryl or C7-20 arylalkyl radical;

$R_5$ and $R_6$ are each independently a hydrogen atom; or a C1-20 alkyl, C6-20 aryl or C3-20 silyl radical;

$R_7$s are each independently a C1-20 alkyl, C6-20 aryl, or C3-20 silyl radical; a C2-20 alkenyl, C7-20 alkylaryl or C7-20 arylalkyl radical;

$Q_3$s and $Q_4$s are each independently a halogen radical; a C1-20 alkyl or C6-20 arylamido radical; or a C1-20 alkyl radical; and M is Ti, Zr or Hf.

4. The catalyst composition of claim 1, wherein the transition metal complex precatalyst is represented by one of Formulae below:

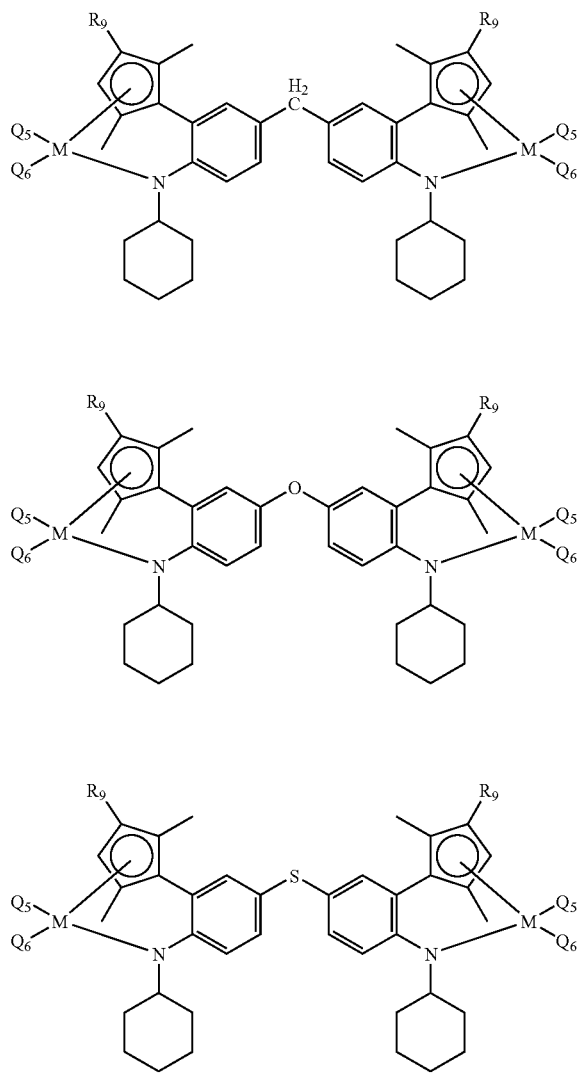

where, $R_9$ is a hydrogen atom or a methyl radical, and $Q_5$s and $Q_6$s are each independently a methyl, a dimethylamido, a diethylamido or a chloride radical.

5. The catalyst composition of claim 1, wherein the mol ratio of the transition metal of the catalyst to the aluminum of the first cocatalyst is in the range of 1:1 to 1:1000, and the mol ratio of the transition metal of the catalyst to the boron or aluminum of the second cocatalyst is in the range of 1:1 to 1:10.

6. The catalyst composition of claim 1, wherein the non-coordinating anon [ZA$_4$]$^-$ comprised in the second cocatalyst which is B[C$_6$F$_5$]$_4^-$.

7. A method of preparing a catalyst composition, the method comprising:

contacting a transition metal complex precatalyst represented by Formula 1 with a first cocatalyst represented by Formula 2 to prepare a mixture; and contacting the mixture of the precatalyst and the first cocatalyst with a second cocatalyst represented by Formula 3:

Formula 1

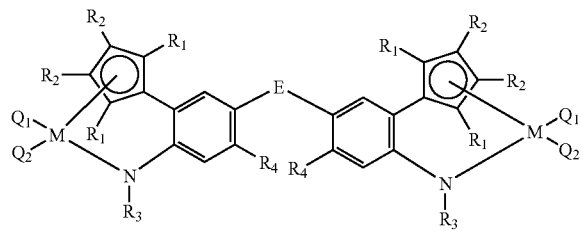

where, $R_1$s and $R_2$s are each independently a hydrogen atom; a C1-20 alkyl, C6-20 aryl or C3-20 silyl radical; a C2-20 alkenyl, C7-20 alkylaryl, or C7-20 arylalkyl radical; or a metalloid radical of Group 14 substituted with a C1-60 hydrocarbyl, wherein $R_1$ and $R_2$ can be connected to each other by an alkylidine radical containing a C1-20 alkyl or C6-20 aryl radical to form a ring;

$R_3$s are each independently a C1-20 alkyl, C6-20 aryl, or C3-20 silyl radical; a C2-20 alkenyl, C7-20 alkylaryl, or C7-20 arylalkyl radical; or a metalloid radical of Group 14 substituted with a C1-60 hydrocarbyl;

$R_4$s are each independently a hydrogen atom; a halogen radical; or a C1-20 alkyl or C6-20 aryl radical, wherein two $R_4$s can be connected to each other;

E is a covalent bridging group connecting the two phenylene rings that is selected from the group consisting of —O—; an epithio group; a carbonyl group; a silane group; a disilane group; a substituted or unsubstituted C1-60 hydrocarbylene group; and a substituted or unsubstituted C1-60 heterohydrocarbylene group including Group 4B, 5B or 6B atom;

M is Ti, Zr or Hf; and $Q_1$s and $Q_2$s are each independently a halogen radical; a C1-20 alkyl, or arylamido radical; a C1-20 alkyl, C2-20 alkenyl, C6-20 aryl, C7-20 alkylaryl, or C7-20 arylalkyl radical; or a C1-20 alkylidene radical;

$Al(R_6)_3$ Formula 2 where, $R_6$ is a C1-20 hydrocarbyl radical; C1-20 hydrocarbyl radical substituted with a halogen atom; and $[L-H]^+[Z(A)_4]^-$ Formula 3 where, L is a neutral Lewis base; $[L-H]^+$ is a Bronsted acid; Z is B or Al; and A is a C6-20 aryl or C1-20 alkyl radical in which at least one hydrogen atom is substituted with a halogen atom, a C1-20 hydrocarbyl, C1-20 alkoxy or phenoxy radical.

8. A method of preparing an olefin polymer by contacting the catalyst composition according to claim 1 with monomers.

9. The method of claim 8, wherein the monomer is at least one monomer selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

10. The method of claim 8, wherein the catalyst composition is contacted with the monomers at a temperature in the range of 70 to 180° C.

11. A method of preparing an olefin polymer by contacting the catalyst composition according to claim 2 with monomers.

12. A method of preparing an olefin polymer by contacting the catalyst composition according to claim 3 with monomers.

13. A method of preparing an olefin polymer by contacting the catalyst composition according to claim 4 with monomers.

14. A method of preparing an olefin polymer by contacting the catalyst composition according to claim 5 with monomers.

15. A method of preparing an olefin polymer by contacting the catalyst composition according to claim 6 with monomers.

* * * * *